(12) United States Patent
Ergin (10) Patent No.: US 8,761,568 B2
(45) Date of Patent: Jun. 24, 2014

(54) METHOD AND APPARATUS FOR SYNCHRONIZING SUBTITLES WITH A VIDEO

(75) Inventor: Tanil Ergin, Gaziemir/Izmir (TR)

(73) Assignee: Vestel Elektronik Sanayi Ve Ticaret A.S. (TR)

( * ) Notice: Subject to any disclaimer, the term of this patent is extended or adjusted under 35 U.S.C. 154(b) by 1101 days.

(21) Appl. No.: 11/311,981

(22) Filed: Dec. 20, 2005

(65) Prior Publication Data

US 2007/0140656 A1 Jun. 21, 2007

(51) Int. Cl.
*H04N 5/931* (2006.01)
*H04N 5/932* (2006.01)

(52) U.S. Cl.
USPC ............ 386/207; 386/230; 386/244

(58) Field of Classification Search
CPC .............. H04N 5/278; H04N 21/4307; H04N 21/4884; G11B 27/00
USPC ............... 386/95, 12, 13, 113, 207, 230, 244
See application file for complete search history.

(56) References Cited

U.S. PATENT DOCUMENTS

| | | | | |
|---|---|---|---|---|
| 2003/0174796 A1* | 9/2003 | Isozaki | | 375/354 |
| 2003/0221161 A1* | 11/2003 | Balassanian et al. | | 715/500.1 |
| 2004/0044532 A1* | 3/2004 | Karstens | | 704/271 |
| 2005/0180462 A1 | 8/2005 | Yi | | |
| 2005/0185929 A1 | 8/2005 | Kang | | |
| 2006/0044469 A1* | 3/2006 | Kim et al. | | 348/515 |
| 2007/0016611 A1* | 1/2007 | Wang | | 707/104.1 |

FOREIGN PATENT DOCUMENTS

| | | | |
|---|---|---|---|
| EP | 0 790 743 A2 | 8/1997 | |
| EP | 1 443 773 A1 | 8/2004 | |
| KR | 10-2002-0085490 | * 7/2004 | ........ H04N 7/087 |

OTHER PUBLICATIONS

WheetHet-Video-Synchronizing subtitles for your DivX, Mar. 2004, p. 1-2.*
Notice of Opposition against EP 1804495B1 (9 pages), Mar. 17, 2009.
SubSync web page htttp://users.terenet.be/vlad/subsync (2 pages), Mar. 4, 2009.
Digital Digest web page http://www.divx-digest.com (4 pages), Mar. 4, 2009.
SubSync preliminary documentation web page http://users.telecast.be/vlad/subsync/ (4 pages), Mar. 18, 2009.
SubSync preliminary documentation web page http://users.telecast.be/vlad/subsync/ (1 page), Mar. 18, 2009.
Mar. 9, 2009 email from Marynick & Eichstadt regarding publication of SubSync software (1 page).
Freecorp.org web page http;://freecorp.fre (2 pages), May 3, 2009.
Freecorp FurySync web page http://sourceforge.net/projects/furysync (1 page), Mar. 4, 2009.

(Continued)

*Primary Examiner* — Thai Tran
*Assistant Examiner* — Girumsew Wendmagegn
(74) *Attorney, Agent, or Firm* — Conley Rose, P.C.

(57) ABSTRACT

The invention relates to a method and apparatus for synchronizing subtitles with a video, the method comprising, upon receipt of a user input indicative of a synchronization error between the video and the subtitles displayed on the display, modifying the relative timing of the subtitle and video displays in accordance with the user input during playback of the video on a video display.

8 Claims, 7 Drawing Sheets

(56) References Cited

OTHER PUBLICATIONS

Freecorp FurySync Screenshorts of FurySync 2.0 et Fury Sync 2.9, French version English tutorial version 2.0, Feb. 15, 2008 (44 pages).

Mar. 9, 2009 email from Marynick & Eichstadt regarding question concerning publishing date of FurySync software (1 page).
English Translation of Notice of Opposition against EP 180449581 (10 pages), Mar. 17, 2009.

* cited by examiner fig. 1

First 20 seconds is Removed to save space.
(advertisements, etc.)

fig. 2

Sample Subtitle Synchronization Menu fig. 3

Physical Video and Subtitle Data on Medium

Fig 4

Synchronized Video and Subtitle Data

METHOD AND APPARATUS FOR SYNCHRONIZING SUBTITLES WITH A VIDEO

The present invention relates to a method and apparatus for synchronising a video and subtitles. The invention also relates to a consumer electronic device capable of playback of a video. Examples of such consumer electronic devices include but are not limited to DVD and VCD display devices and players. In embodiments, the invention also relates to consumer electronic devices that support MPEG4, DivX and other video files that can be played with external subtitle files.

The method and apparatus of embodiments of the invention can be used in DVD, DivX, MPEG4 players, portable media players, digital media players and any device that supports DivX/MPEG4 playback.

In the present specification, the term "video file" is the data file comprising the video data for playing back a video on a video display device. A "subtitle file" is the data file containing the data that is to be decoded and played back on a video display device as the subtitle images overlaying the video images on the display. A "video display device" is any device capable of playback of a video. It includes all the examples given above.

In the present specification, where the term "a video" is used, this refers to any playback or recording of moving images (or still images). No qualitative standard is implied.

Videos that use the DivX format, which is based on MPEG4 compression standard are widely used. New users of DivX are entering the market at a high rate particularly since the release of consumer electronics devices capable of DivX playback. Such consumer electronic devices include DivX players, DVD players with DivX support etc.

In MPEG4 based videos, video files and subtitle files can be created independently. Thus, it is possible for a DivX user to download a video file from an external source such as the internet, and create their own subtitle file, for example including subtitles in a particular desired language. It is therefore possible that any particular subtitle file will not necessarily comply with other video files that have been downloaded by the user. For example, the frame rate of the video file may not correspond to the frame rate for which the subtitle file was initially created. When playing a video using a video file and a subtitle file obtained, for example, from different external sources, problems with synchronisation between the images displayed as part of the video itself and the subtitles can occur, as will be explained below.

Videos or movies are essentially a series of pictures, each displayed for only a fraction of a second, fast enough so that the human eye is not able to see each individual image but rather perceives a moving image. This same technique is also used in 3-D animations/games, which are rendered on a frame-by-frame basis.

"Frame rate" is the number of frames in a given period of time, e.g. one second. Frame rate is sometimes referred to in terms of its commonly used unit, "frames per second" (FPS). Different video standards use different frame rates. For example, NTSC film has a frame rate of 23.976 FPS. NTSC has a frame rate of 29.97 FPS, PAL film has a frame rate of 25 FPS.

MPEG4 video data is comprised of standard data packages. The subtitle files typically used with MPEG4 video files comprise subtitle data relating to the subtitles to be displayed, and auxiliary data including timing data used to ensure that the subtitles are displayed at the right time. During playback, whilst the MPEG4 video data is decoded from the video file and displayed, the subtitles are also processed and displayed.

As explained above, MPEG4 and DivX video data can be played with an auxiliary external subtitle file that has been loaded from an external source, such as an external file. There are several subtitle formats supported for use with MPEG4 and DivX. Users can download a DivX movie or video from the internet and search for a subtitle file having subtitles that accompany the video in a desired language. Once found, the video file and external subtitle file are burnt onto a single disk or recorded onto other such recording medium for playback in a DivX-capable consumer electronic device. They may be burnt or recorded onto separate disks or recording media but for convenience usually a common disk or medium is used.

At this point, the relative timing between the video (image) data and the subtitle data is fixed. If there is any problem with the relative timing, e.g. if there is a synchronisation error, the only way that this problem can be overcome is by editing the subtitle file in a suitable device, e.g. a computer, with some specific software, and then burning the video file and subtitle file again to a new disk. Clearly, this is difficult particularly as it requires a significant degree of technical ability and understanding. In addition, it is time consuming and expensive as whenever synchronisation error problems are encountered, a new disk must be burnt.

Some attempts to address this problem have been made in the art. Subtitle converter programs exist which can be used to modify the frame rate of the subtitle file. To do this, first the frame rate of the video file must be known. Secondly, the frame rate for which the subtitle file was originally prepared must be known. Then, the subtitle file may be processed in such as way so that it matches the frame rate of the video file. This method is complex and time consuming, which is clearly undesirable. Windows®-based programs for editing sub-title files to address synchronisation error already exist. Examples include sub-title Workshop, Time Adjuster and VobSub.

As mentioned above, a number of different subtitle formats exist. These include, but are not limited to, Micro DVD, SubViewer 1.0, Substation Alpha, SAMICaptioning and PowerDivx.

Using any of the commonly available subtitle formats, converter programs are not a simple and convenient way to address the synchronisation error problem. This is because users will not necessarily have immediate access to a computer or the tools necessary for the conversion process every time the problem is encountered. Typically, the problem will only be discovered when a user has started watching a video or movie on a display device. The known methods for correcting synchronisation error are time consuming and quite impractical as typically creating a new subtitle file takes at least five minutes.

According to a first aspect of the present invention, there is provided a method of synchronising a subtitle with a video, the method comprising, upon receipt of a user input indicative of a synchronisation error between the video and the subtitles displayed on a display, automatically modifying the relative timing of the subtitle and video displays in accordance with the user input during playback of the video on a video display.

The invention provides an apparatus and a method by which synchronisation between subtitles and video can be achieved during playback of the video. Thus, the problem of having to burn a new media to synchronise the video and subtitles whenever a synchronisation error problem is encountered, is not needed. The invention provides a simple and robust method by which subtitles may be synchronised on-the-fly with a movie.

If the relative synchronisation between subtitles and a video to which they relate varies during the video then it can become necessary to perform a synchronisation process more than once during playback of the video.

In accordance with one aspect of the present invention, there is provided apparatus for synchronising one or more subtitles with a video during display of the video on a display, the apparatus comprising a modifier for modifying the relative synchronisation of the subtitle and the video in real time in response to receipt of a user input indicative of a synchronisation error between the video and the or each of the subtitles displayed on the display. Preferably a receiver is provided for receiving the or each user input.

In contrast to known techniques for addressing the problem of synchronisation errors between movies and subtitles, in embodiments, the present invention enables a user, whilst watching a video with subtitles, to modify the relative timing of the subtitles so that the video and the subtitles are synchronised. In many situations, a single adjustment to the timing of the subtitles is all that is required to ensure synchronisation of the subtitles with the video throughout the video or whatever is being watched.

The receiver and the modifier may be any suitable components or collection of components for performing the desired function. In one particular example the modifier may be an ASIC or a processor capable of performing the necessary modification. The processor may be a dedicated processor or it may be a processor having other functionality too arranged to perform the timing adjustment required to the subtitles and/or video.

It is common that a user does not recognise that there is a problem with the synchronisation of subtitles with a video at the beginning of the video, but only realises at some later time whilst watching the video that there is a synchronisation error. Using known techniques, it would at that stage be necessary to adjust the relative timing of the subtitle and the video by one of the known methods described above. Clearly, this is not desirable. In contrast, using methods and apparatus of embodiments of the present invention, the relative timing of the subtitles can be adjusted throughout the playback of the video. It makes no difference at what stage during the playback the synchronisation error is recognised and addressed. Thus, the invention provides a convenient, user-friendly method by which subtitles can be synchronised with a video during playback of the video.

According to a second aspect of the present invention, there is provided a graphical user interface for display on a display screen during display of a video on the display screen, the graphical user interface including relative timing adjustment means, responsive to a user input to represent a desired relative timing-shift between subtitles displayed on the display and the video.

According to a further aspect of the present invention, there is provided apparatus for synchronising subtitles with a video, the apparatus comprising;

means for receiving a user input indicative of the relative synchronisation between a video and the subtitles;

means for modifying the relative synchronisation of the subtitle and the video during playback of the video on a video display.

Examples of embodiments of the present invention will now be described in detail with reference to the accompanying drawings, in which.

Each of the subtitle formats identified above, uses a particular parameter or set of parameters for encoding and determining the timing of the display of subtitles. Some use time information (seconds), some use frames and others use both seconds and frames. If the subtitle file uses only time information as auxiliary data, then it is possible that there will be no synchronisation error problem, whatever the frame rates of the subtitle file and video file recording on a recording medium. This is because the timing of the display of the images of the videos and the display of the subtitles is determined only by the actual seconds that have elapsed. Accordingly, whatever the frame rate for which the files were encoded, if a subtitle is encoded to be displayed at a particular time then this is the time it will be displayed irrespective of the frame rate of the subtitle file.

Figure 1:
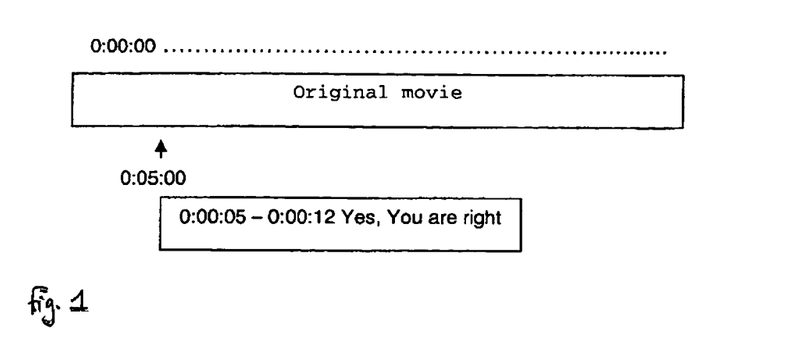
FIG. 1 is an example showing schematically relative timing of the displays of a video and a subtitle.

However, there are a number of situations, even when the frame rate of the video and subtitle files are the same that synchronisation error problems may occur. Referring to FIG. 1, it is possible that a user who encodes a film may shorten the video data so that less memory is required to store the file. This is particularly possible when the video is encoded in MPEG4 or DivX format. If the video file is shortened, and is then used with a subtitle file (encoded for use with the same frame rate) that has not been correspondingly shortened, there will be a synchronisation error problem in that, when displayed, the subtitles will be displayed out of synchronisation with the corresponding images from the video.

Figure 2:
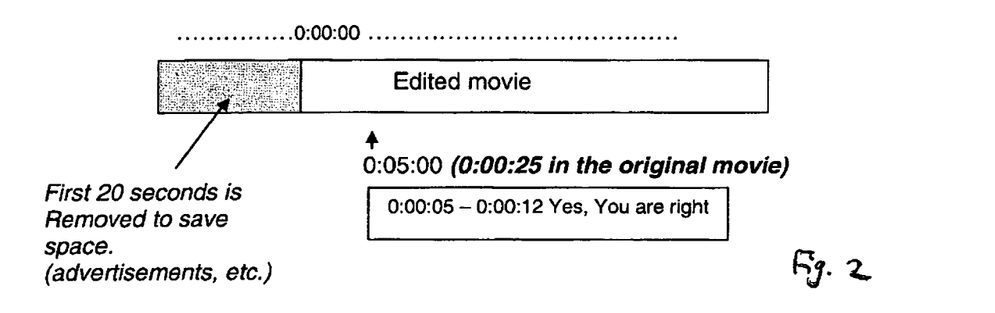
FIG. 2 is another example showing schematically a synchronisation error problem between a video and a subtitle.

Referring to FIGS. 1 and 2, a video may have a number of seconds of advertisement video before the substantive content, e.g. a feature film actually begins. If a user when encoding the video, cuts 20 seconds from the beginning, i.e. to remove some/all of the advertisement and to save memory, then the 21st second of the original video will be the first second of the displayed video. If the subtitle is created based on the original video, including all of advertisement, then there will be a 20 second delay between the subtitle and the film. In other words, images of the film will appear 20 seconds before the corresponding subtitle on the display. An example is shown in FIGS. 1 and 2. The subtitle "yes, you are right" in this example, should be displayed at the 5th second of the original substantive content but the corresponding subtitle is in fact shown at the 25th second of the substantive content given that the subtitle itself has the original advertisement timing calculated into the original timings. This is shown clearly in FIG. 2.

A particular problem arises when the respective frame rate of the video file and an external subtitle file are not the same.

There are a number of different frame rates at which videos can be encoded, as explained above. Thus, the number of frames in one second can differ from video to video. When a frame based subtitle is used, a synchronisation error problem will arise during playback when there is a difference between frame rates of the subtitle file and the video file.

For example, if a video is encoded as a 30 frame per second video file, each frame is displayed for $\frac{1}{30}$ second, i.e. approximately 0.033 seconds. The start of the 15th second of the video will correspond to the 450th frame (30×15). If, however, the same video is encoded at 25 frames per second, the start of the 15th second of the video will correspond to the 375th frame (25×15). If the subtitle is created for 30 frames per second video, then the subtitle will be displayed at the correct time, i.e. in synchronisation with the corresponding images from the video if the 30 FPS video file is used. However, when the same subtitle file is used for a video file encoded at 25 FPS, the subtitle will be shown at the 18th second (450/25). Thus, there is a synchronisation error of 3 seconds. The subtitle will be displayed 3 seconds after the corresponding images from the video. In addition, the delay between the subtitles and the corresponding images will increase as the video is played back. The timings are somewhat approximate given that metadata associated with images in the video file may affect the precise timings, as explained in greater detail below with reference to FIG. 8.

As an example, consider the case when a user wants to show a 25 FPS movie with a subtitle file created for a 23 FPS movie. The start of the 5th second of the movie (23 FPS movie) will correspond to the 115th frame (5×23). However, the 115th frame of the second movie (25 FPS movie) corresponds to the 4.6th second (115/25) of the second movie. The time difference between the video and the subtitle will be 5−4.6=0.4 second, and this delay between the images of the video and the display of the corresponding subtitles will therefore be experienced by users.

The 50th second of the first movie (23 FPS movie) will be at the 1150th (50×23) frame whereas the 1150th frame will be shown in the second movie (25 PFS movie) at the 1150/25=46th second. The time difference between the video and the subtitle will thus be 50−46=4 seconds.

The 100th second of the first movie (23 FPS movie) will be at 100×23=2300th frame whereas the 115th frame will be shown in the second movie (25 FPS movie) at the 2300/25=92th second. The time difference between the video and the subtitle will be 100−92=8 second. Thus, it can be seen that the time difference or synchronisation error between the video images and the corresponding subtitles increases as the video progresses.

Figure 3:
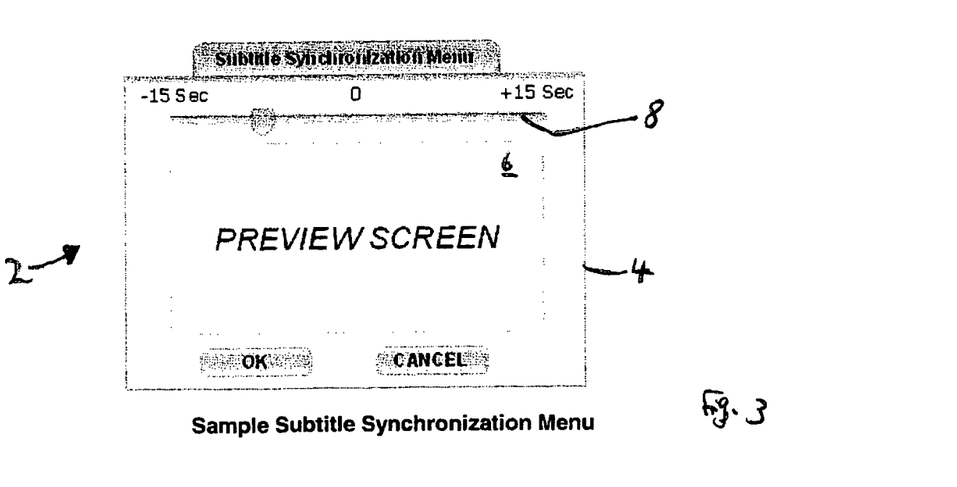
FIG. 3 is a schematic representation of a graphical user interface for use with an example of a method of an embodiment of the present invention.

To address the general problem of the synchronisation error between subtitles and images of a video, it is preferred that a graphical user interface (GUI) 2 is provided, as shown in FIG. 3. The GUI comprises a window 4 having a preview screen 6 arranged therein. In addition, a time-adjustment slide 8 is provided for representing the relative time movement of the subtitles with respect to the corresponding video images.

In use, the player i.e. the DVD/VCD player, includes a "subtitle synchronisation" function. When a user encounters or recognises a synchronisation error problem between the video and the subtitles, on a remote control, or directly on the player, the subtitle synchronisation function is selected. Thus, the user is then able to time shift the display time of the subtitles without processing the subtitle file or without creating a new file from an external subtitle file. For example, if the subtitle lags the video by 1.5 seconds, the user will navigate to the subtitle synchronisation menu and shift the display time of the subtitle to a new time of 1.5 seconds before the original display time.

As mentioned above, in FIG. 3, a GUI is shown for implementing the desired functionality. It is also possible that the subtitle synchronisation can be achieved by the provision of one or more dedicated buttons on a remote control unit associated with the player. In other words, the on-screen GUI is preferable only. Some remote control units are provided with in-built displays e.g. LCD displays. In one embodiment, the GUI is arranged to appear on the remote control display.

In the example shown in FIG. 3, a preview screen is shown. This provides a preview display within the video display. The preview shows the effect of the subtitle time shifting operation so that the user does not have to return to a normal playback mode to check if the shifting process has been successful and then return again to the subtitle synchronisation menu to make any further necessary adjustments.

It is of particular importance that no editing of the external subtitle file is necessary. The method by which the synchronisation is achieved will be described in greater detail below. The subtitle format and content remain the same. The process is executed in run time which means that the stored subtitle file remains unaltered and the synchronisation process can be executed as many times as necessary during playback of any particular video.

Figure 4:
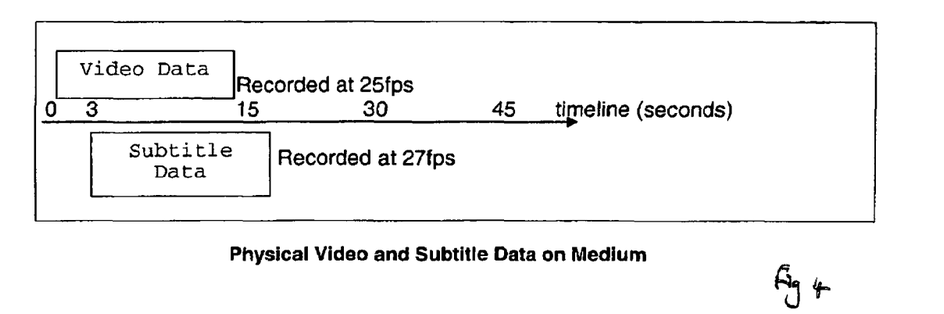
FIG. 4 is a schematic representation of a video file and a subtitle file stored on a recording medium.

FIG. 4 shows a schematic representation of a recording medium, such as a DVD having a video file and subtitle file stored thereon. In the example shown, the video file has been generated at, say, 25 FPS, whereas the subtitle file has been generated for use with a video file recorded at, say, 27 FPS. In other words, the frame rates of the video file and the subtitle file are different. Thus, as explained above, this will lead to synchronisation error problems.

Figure 5:
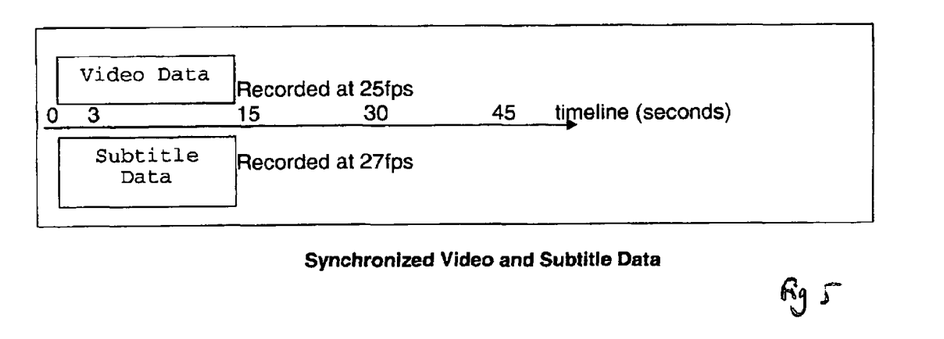
FIG. 5 is a schematic block diagram showing how the video and subtitle files of FIG. 4 will be played back using a method of an embodiment of the present invention.

Using the method and apparatus of embodiments of the present invention, the video file and subtitle file will be played back as shown in FIG. 5. It can be seen that although the video file and the subtitle file have been recorded at different frame rates, the method and apparatus of embodiments of the present invention ensure that when played back, there is desired synchronisation between the subtitles and the video.

Figure 6:
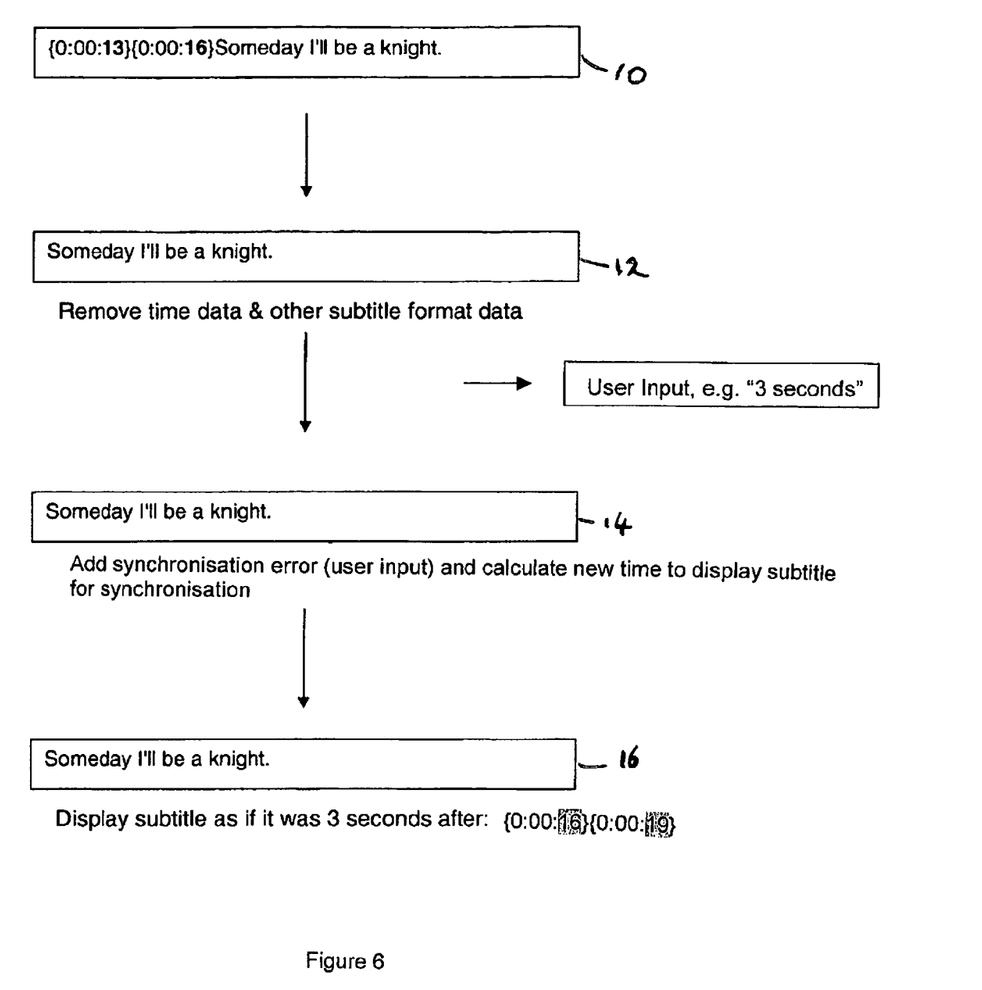
FIG. 6 is a flow diagram showing processing steps used in one example of the present invention.

Referring now to FIG. 6, a flow chart is shown that demonstrates an example of the method of the present invention. At step 10, a subtitle is read from a recording medium. In this case, the subtitle as stored on the recording medium indicates that the display time should start at 13 seconds and finish at 16 seconds. Presuming a delay of 3 seconds has been indicated by the user, the method proceeds in step 12 by removing the time data and any other subtitle format data. At step 14, the synchronisation error is added and a new display time is calculated for the particular subtitle. Step 16 shows the modified metadata associated with the particular subtitle, in this case showing that the subtitle timing will be shifted by 3 seconds so that it will initially be displayed at the 16th second and will remain on screen until the 19th second. Thus, by a simple modification to the auxiliary data associated with the subtitle, synchronisation can be achieved between subtitle file and the video file (and therefore between the subtitles and corresponding images of the video), without requiring any editing of the stored subtitle file and without requiring re-recording of the medium.

In some situations, the synchronisation error, i.e. the time difference between the subtitles displayed and the corresponding images in the video, increases with time. Accordingly, even though at some point relatively near the start of the video, a user may act as described above to synchronise the subtitles and the video, as the video is played back, synchronisation error will appear and be detected again later at some point in the video and develop further as the video progresses.

Table 1 below, shows an example of the increase in synchronisation error in terms of video frames that would be expected due to different frame rates of a subtitle file and a video file. The table shows how the delay increases from the 5th second to the 200th second of a video. As can be seen, where a 23 FPS subtitle file is used with a 25 FPS video file, after 5 seconds, there is a 10 frame discrepancy, whereas after 200 seconds there is a 400 frame discrepancy. Thus, if after 50 seconds, the user modified the synchronisation so as to account for the 100 frame discrepancy, after a further 150 seconds, there would be a new 300 frame discrepancy.

|  | 5th Second | 50th Second | 100th Second | 200th Second |
|---|---|---|---|---|
| 23 FPS (Subtitle | 115th frame | 1150th frame | 2300th frame | 4600th frame |
| 25 FPS (Movie) | 125th frame | 1250th frame | 2500th frame | 5000th frame |
| Difference (Δ) | 10 frames | 100 frames | 200 frames | 400 frame |

To address this particular problem, in a particularly preferred embodiment, the method relies on the calculation of two ratios K1 and K2, for the first and second manual adjustments of the user, where:

$$K = \frac{\text{frame number of a subtitle at a particular second}}{\text{frame number of a video at a particular second}}$$

The ratio K is calculated twice, once when a user first provides an input to synchronise the subtitles with the video, and again when the user repeats the process. This provides two values K1 and K2. After calculating the ratio for the second time, the two ratios, K1 and K2 are compared. If it is determined that $$K_1 = K_2 = \frac{\text{frame rate of subtitle file}}{\text{frame rate of the video file}}$$

the time delay required for every subtitle is calculated based on the ratio $K_1$ thereby enabling each subtitle to be shifted by a different amount ensuring that at all times after the second determination, i.e. the determination of $K_2$, the subtitles and the video will be synchronised. Thus, by receiving two user inputs, synchronisation between the entire video file and subtitle file is enabled. Again, this is achieved without requiring any modification or editing of the subtitle file as stored on the recording medium.

This example of the method can also be used where more than two user inputs are provided. Although the method can function based on only two user inputs at corresponding first and second times, it is possible that the determination of the time-shift required for the sub-titles is not made until more than two user inputs have been received, e.g. 3, 4 or more user inputs. In this case a value for k at each of the corresponding times may be determined and then compared to enable time-shifting of all subtitles for the video, thus ensuring synchronisation of the subtitles with the images throughout the video.

Embodiments of the invention provide a number of significant advantages over the known methods of addressing the synchronisation error problem between subtitle files and video files or subtitles and videos. In particular, synchronisation as described herein is practical and easy. It can typically be achieved in between 10 to 25 seconds without requiring modification of the original subtitle files. Furthermore, synchronisation can be achieved at run-time. A user can adjust the timing of the subtitles, whilst actually watching a video by means of pre-defined buttons or the preview screen or GUI described above. Thus, in contrast to known methods for addressing the synchronisation error problem, embodiments of the present invention enable subtitle timing to be adjusted as many times as necessary during the playback of a video. It is particularly important that adjustment of the subtitle timing can be made at run-time, because synchronisation error can increase as a video progresses.

In known systems, a user may not recognise the synchronisation error at the beginning of a video, but may want to synchronise the subtitle with the video later during viewing. To do this using conventional techniques, a new subtitle file would be required meaning that the video cannot be watched for a period of time whilst the operation is performed.

The apparatus can be implemented by a processor and beneficially can have low memory requirements as the subtitles may be processed in sequence. Thus it is not necessary to store all the modified subtitle metadata at any one time. Indeed, it is only necessary to store the next subtitle for processing.

Figure 7:
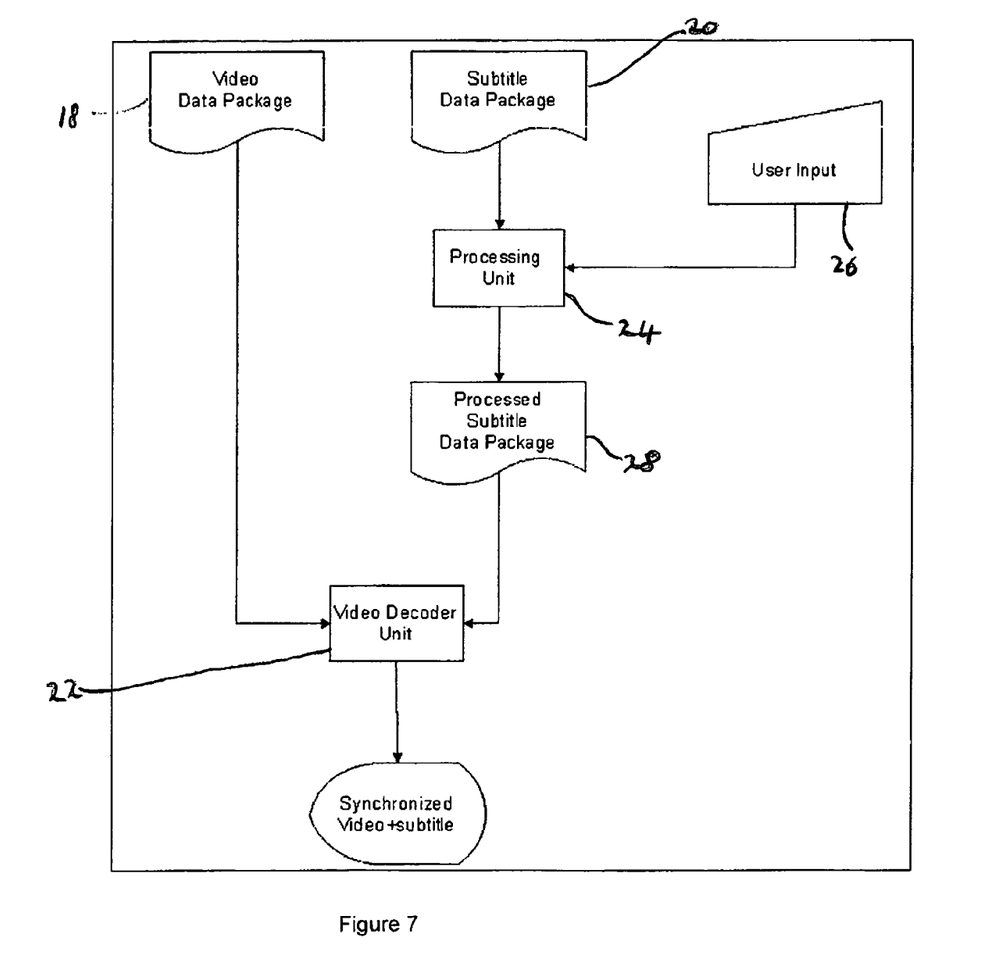
FIG. 7 is a schematic representation of a flow chart showing the steps of an example of a method of an embodiment of the present invention.

FIG. 7 shows a schematic diagram of the subtitle synchronising apparatus according to an example of an embodiment of the present invention. Initially, a video data file 18 and a subtitle file 20 are provided in communication with a video decoder unit 22. The video data file 18 and the subtitle file 20 will typically be read by a reader from a recording medium, such as a DVD, on which they are stored.

The video data file 18 is provided directly to the video decoder unit 22, whereas the subtitle file is provided to a processing unit 24. A user input 26 is received by the processing unit 24 indicative of a user's desired delay for introduction to the subtitle. As explained above, the user input may be derived from an on-screen menu or by the use of an associated remote control unit. A combination of these arrangements can be used for providing the input to the processing unit 24. In response to the user input, the processing unit 24 decodes the stored subtitles from the subtitle file and modifies the associated meta-data to ensure a change in display time is effected corresponding to the user input. The time-shifted subtitles are then provided to the video decoder unit 22. The video decoder unit 22 then provides an output signal including the video images and the subtitles for display.

Figure 8:
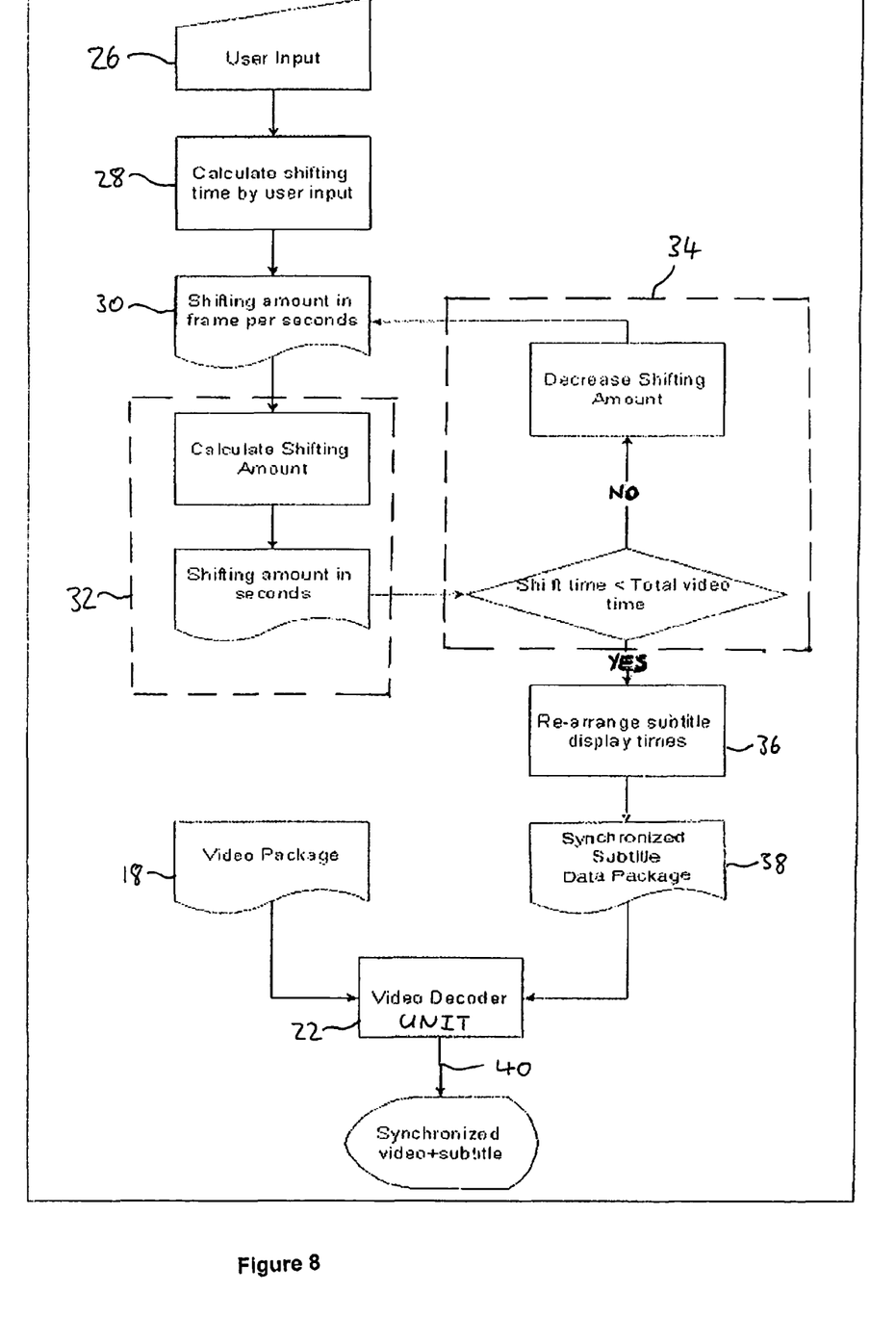
FIG. 8 is a flow chart showing steps from one example of an embodiment of the method of the present invention.

Referring now to FIG. 8, the method of processing the subtitles on-the-fly is shown in more detail. Initially, at step 28 a user input is provided and the required time-shift for the subtitles relative to the video is determined.

It will be appreciated that in effect, when a subtitle is time-shifted, it is moved with respect to the frame order of the video file. At step 30, the number of frames of video file by which it is necessary to move the subtitle in question, is determined. At step 32, the actual time shift and frame number shift is determined. This takes into account metadata stored in the video frames. In other words, even though the video may be captured at 25 frames per second, where the metadata is stripped from any particular consecutive set of 25 frames, the remaining display time may well be less than one second. Thus, at step 32, this is taken into account. The step 32 is optional, although it is preferably included as it enables an almost 100% synchronisation between the sub-titles and the images by taking into account the video file metadata.

Next, a loop shown as step 34 may optionally be included. A determination is made as to whether or not the required time-shift is less than the total video time. If it is not, then clearly an error has occurred and the time-shift amount must be reduced. If the condition is satisfied, at step 36, the adjusted subtitle display times are calculated as described above with reference to FIG. 6.

Next, at step 38 the time-shifted subtitle files are provided to the video decoder 22 together with the video files 18. The video decoder unit combines the subtitle files and the video files to produce an output signal 40 for providing to a suitable display device.

Figure 9:
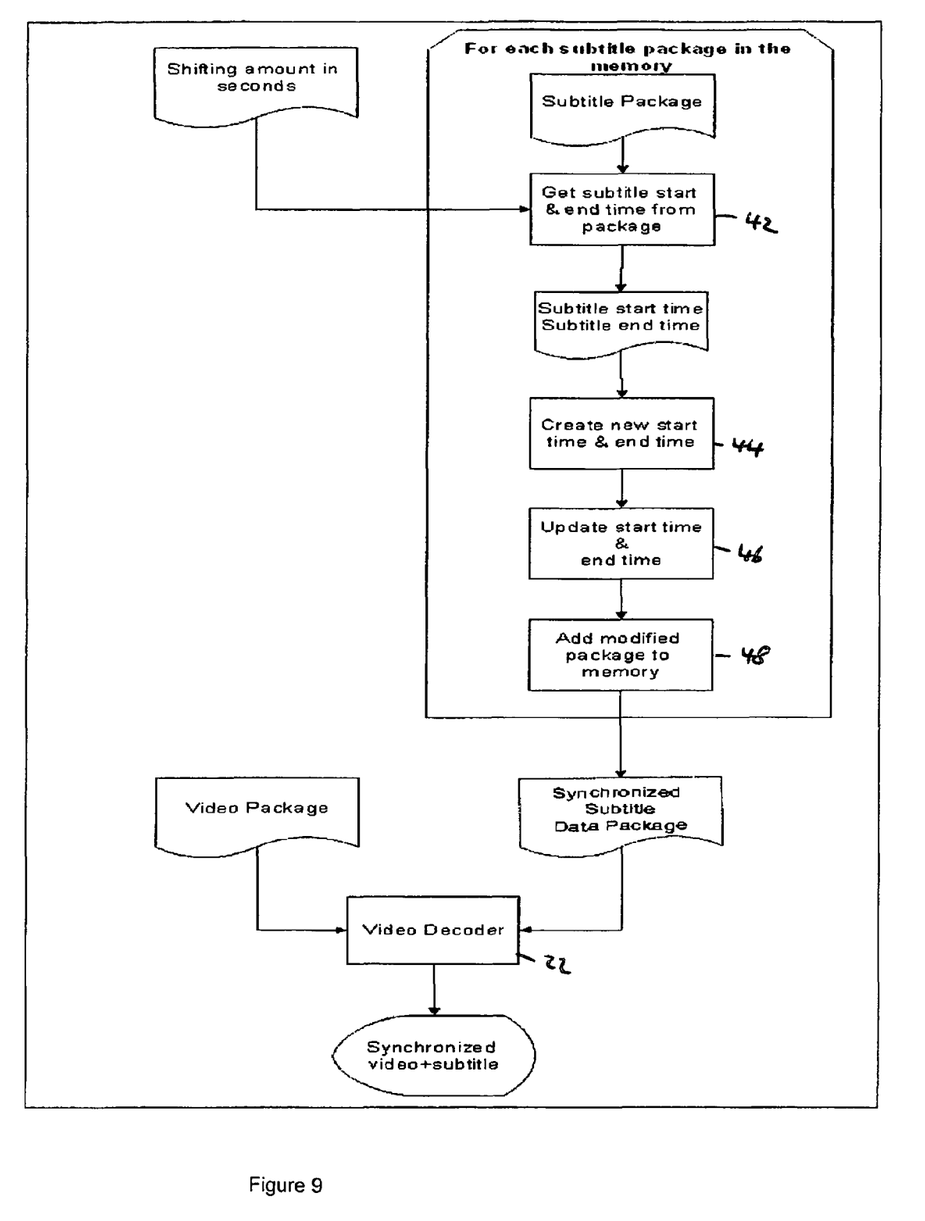
FIG. 9 is a schematic flow chart showing steps from a method according to an example of an embodiment of the present invention.

FIG. 9 shows in more detail the step 36 from FIG. 8. As can be seen, initially, once a time-shift amount in seconds has been received-from the processor, at step 42, the original start and end time of the subtitle is determined. Next, at step 44, a new start and end time is determined. At step 46, this new start and end time is written to the subtitle in question. At step 48, the modified subtitle file may be provided to a system memory and from there to the video decoder unit 22.

Thus, a simple and robust method is provided by which in real-time subtitle files can be modified in such a way as to ensure synchronicity with video files ensuring that the displayed subtitles are synchronised with the corresponding images from the video. As the process is performed effectively on-the-fly the memory requirements of this system are relatively low as at any time, only a relatively small number of subtitles will be being edited.

It is expected that the apparatus may be implemented in an integrated circuit for incorporation into a display device such as a television receiver or indeed any consumer device that is capable of video disk playback such as DVD or VCD and/or memory cards such as LMC, MS, SD, XD, etc. The invention may also be implemented in any consumer electronic device that supports MPEG4 or DivX playback with external subtitles. Thus, any such consumer electronics device capable of executing the method of the present invention are within the scope of preferred embodiments of the present invention.

Figure 10:
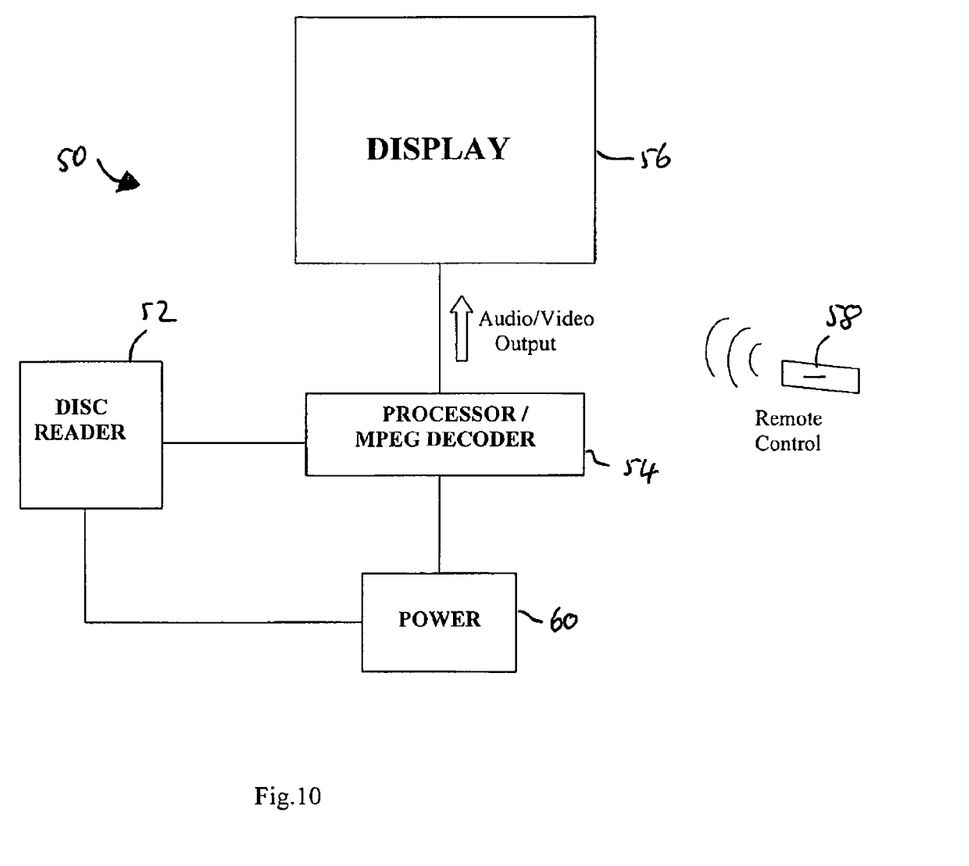
FIG. 10 is a schematic representation of a display device incorporating the present invention.

FIG. 10 shows an example of such a consumer electronic device. The example is shown schematically.

The device 50 includes a disk reader 52 for reading a disk containing a video file and a subtitle file as explained above. The disk reader is arranged in communication with a processor 54 which itself is connected to a display 56. In the example shown, the processor includes an MPEG decoder or at least MPEG decoding functionality. In the example shown in FIG. 10, a remote control unit 58 is provided for enabling a user to provide the required inputs to the processor 54 to effect the desired time-shifting of the subtitles relative to the images of a video. A power source 60 is provided for providing power to each of the disk reader 52 and the processor 54.

The device shown in FIG. 10 is shown schematically and may be any suitable consumer electronic device that is capable of disk playback and supports MPEG4, DivX playback with external subtitles. It will be appreciated that a number of components have not been shown in FIG. 10. It is only intended that FIG. 10 shows the relevant components for implementing one particular embodiment of the present invention.

While the present invention has been described with respect to specific embodiments and applications thereof, numerous alternatives, modifications, and applications, and variations will be apparent to those skilled in the art having read the foregoing description. The invention is intended to embrace those alternatives, modifications, and variations as fall within the broad scope of the appended claims. Accordingly, the scope of the invention should be limited only by the attached claims.

The invention claimed is:

1. A method of synchronizing subtitles from a stored subtitle file with a video displayed on a video display, the subtitles and the video being displayed on a common video display, the method comprising:
   on receipt of a user input, displaying a graphical user interface on the common video display to enable a user to intuitively vary the relative timing of the subtitles and the video;
   receiving at least first and second user inputs at corresponding at least first and second times, the at least first and second inputs indicative of a synchronization error between the video and the subtitles displayed on the common video display;
   when each of the at least first and second user inputs are received, determining the relative synchronization between the subtitle and the video at the at least first and second times;
   determining an initial timing of subtitles within a subtitle file; and
   in dependence on the relative synchronizations at the at least first and second times, modifying the initial timing for the subtitles in the subtitle file in real time and without altering the subtitle file so as to modify the relative timing of the subtitles and the video displayed on the common video display during playback of the video on the common video display.

2. The method according to claim 1, comprising when a user input is received, forming a preview display within the video display and within the preview display, displaying the video and subtitles in real time with a relative synchronization as determined by the user in real time.

3. An apparatus for synchronizing subtitles from a stored subtitle file with a video for display on a common video display, the apparatus comprising:
   a graphical user interface on the common video display to enable the user to intuitively vary the relative timing of the subtitles and of the video upon receipt of a user input;
   a receiver for receiving at least first and second user inputs at corresponding at least first and second times, the at least first and second user inputs indicative of the relative synchronization between the video and the subtitles at the first and second times;
   a determiner for determining the relative synchronization between the subtitle and the video at each of the at least first and second times;
   a determiner for determining an initial timing of subtitles within a subtitle file; and
   a modifier for modifying the initial timing for subtitles in the file in real time and without altering the subtitle file, in dependence on the relative synchronizations between the subtitles and the video at the at least first and second times so as to modify the relative synchronization of the subtitles and the video during playback of the video on the common video display.

4. The apparatus according to claim 3, comprising a generator for generating a preview display within an associated video display for displaying in real time the video and the subtitle wherein the subtitle is time-shifted in dependence on the received user input or inputs.

5. The apparatus according to claim 3, comprising a reader for reading from a recording medium a video file and a subtitle file.

6. A video player, the player comprising:
apparatus according to claim 3; and,
an output signal generator for providing an output signal to a display device to enable display on a said display device of a video with synchronized subtitles.

7. A video player according to claim 6, wherein the video player is one or more of a DVD player, a DivX player, an MPEG4 player, a portable media player, a digital media players or any device that supports DivX and/or MPEG4 playback.

8. A computer program on a non-transitory computer readable medium arranged to generate a graphical user interface for display on a display screen during playback of a video on a common display screen, the graphical user interface including relative timing adjustment means representative of a relative timing of the subtitles, and being responsive to at least a first and second user input corresponding to at least first and second times, the at least first and second user inputs to represent and cause a desired relative timing-shift between subtitles from a stored subtitle file displayed on the display and the video in real time and without altering the subtitle file, wherein the at least first and second user inputs are indicative of a synchronization error between the video and the subtitles displayed on the common display screen.

* * * * *